Sept. 7, 1926. 1,599,193
J. WICKERSHAM
FUEL AND EXHAUST GAS CONTROL DEVICE FOR ENGINES
Filed March 5, 1925 2 Sheets-Sheet 1

Witness
Inventor
Joyce Wickersham
by Bair & Freeman Attorneys

Sept. 7, 1926.   J. WICKERSHAM   1,599,193
FUEL AND EXHAUST GAS CONTROL DEVICE FOR ENGINES
Filed March 5, 1925

Witness
Ray Rusher

Inventor
Joyce Wickersham
By Bair & Freeman Attorneys

Patented Sept. 7, 1926.

1,599,193

UNITED STATES PATENT OFFICE.

JOYCE WICKERSHAM, OF DES MOINES, IOWA.

FUEL AND EXHAUST-GAS CONTROL DEVICE FOR ENGINES.

Application filed March 5, 1925. Serial No. 13,176. REISSUED

The object of my invention is to provide a positive acting fuel feed device for engines which is comparatively cheap in construction, yet durable and efficient.

More particularly, my invention relates to a device for supplying fuel to the cylinders of an engine and for carrying the exhaust gases therefrom, and the provision of novel packing means for preventing the escape of gases between the stationary parts of the engine and the rotating valve tubes.

A further object is to provide rotating valve tubes to control the intake and exhaust of gases to and from the cylinders of an engine, the tubes being operatively connected to the crank shaft of the engine and properly timed.

A still further object is to provide a pair of valve tubes, one for incoming gases and one for exhaust gases. Fins are provided in these tubes for properly controlling the gases passing through them.

With these and other objects in view, my invention consists in the construction, arrangement and combination of the various parts of my device, whereby the objects contemplated are attained, as hereinafter more fully set forth, pointed out in my claims, and illustrated in the accompanying drawings, in which:

Figure 7 is a sectional view on line 7—7 of Figure 1.

Figure 2:
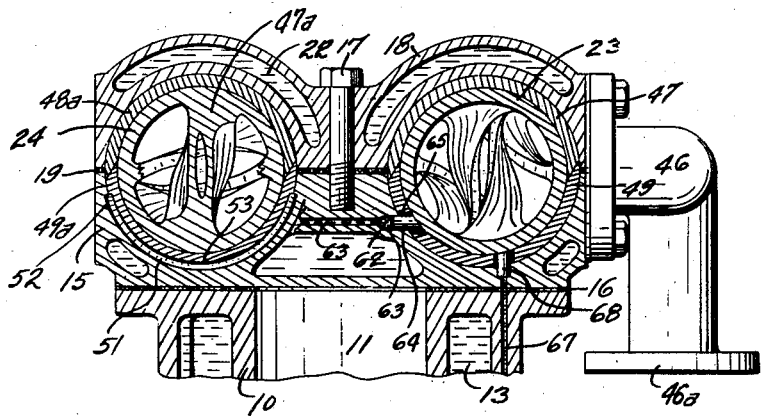
Figure 2 is a sectional view on line 2—2 of Figure 1.

In the accompanying drawings, I have used the numeral 10 to indicate the block of an engine. The usual cylinders 11 are formed therein, and pistons 12 reciprocate in the cylinders.

The engine block 10 is cooled by water in the space 13. The foregoing details generally apply to the ordinary internal combustion engine.

Secured to the block 10 by cap screws 14 is the cylinder head 15. A suitable gasket 16 is interposed between them for effecting a seal for preventing the escape of gas or leakage of water.

Secured to the cylinder head 15 by cap screws 17 is a valve head 18. A gasket 19 is provided between them.

A threaded opening 20 extends through the valve head 18 and the cylinder head 15 at the center of each cylinder.

Spark plugs 21 for igniting the mixture in the cylinders are received in the openings 20.

Water spaces 22 are provided wherever possible in the cylinder head 15 and the valve head 18.

I find that by the design of these heads, as illustrated, considerable space is obtainable for containing cooling water and that the exhaust gas valve and spark plugs, which become quite hot in operations, are efficiently cooled.

Figure 1:
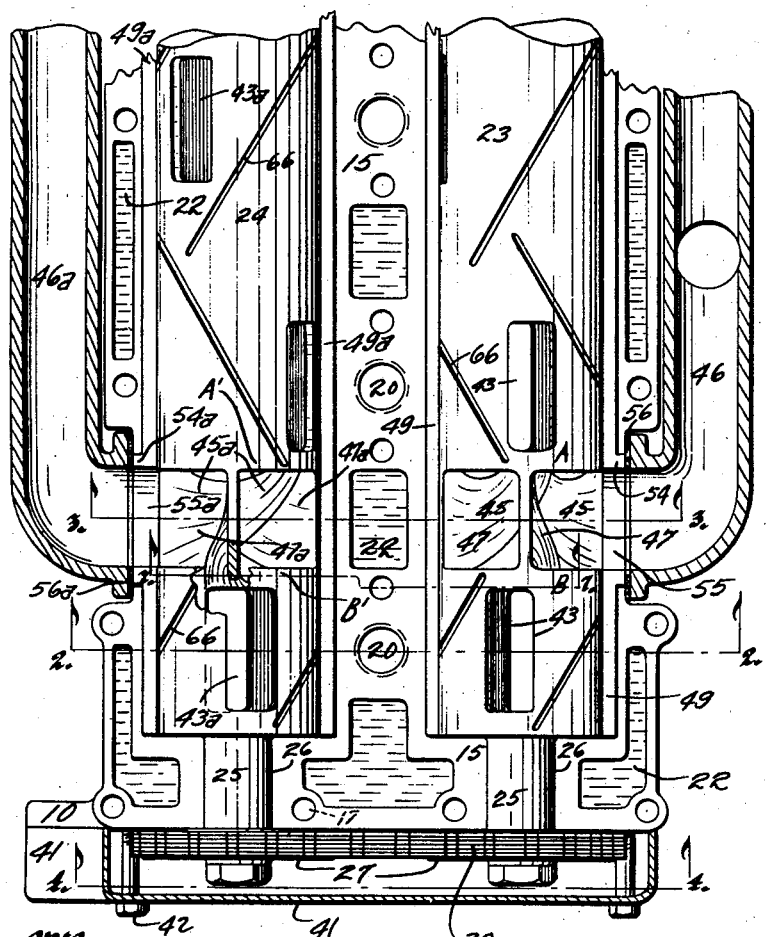
Figure 1 is a plan view of an engine with the valve head removed, showing the intake and exhaust valve tubes.
Figure 8:
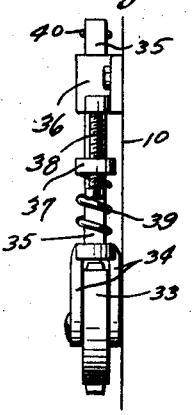
Fig. 8 is an elevation view of the idler sprocket and tension means for keeping the chain drive tight.
Figure 2:
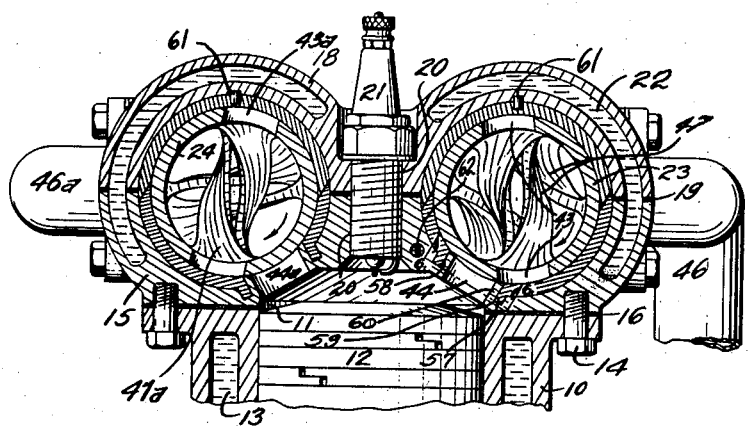
Figure 3:
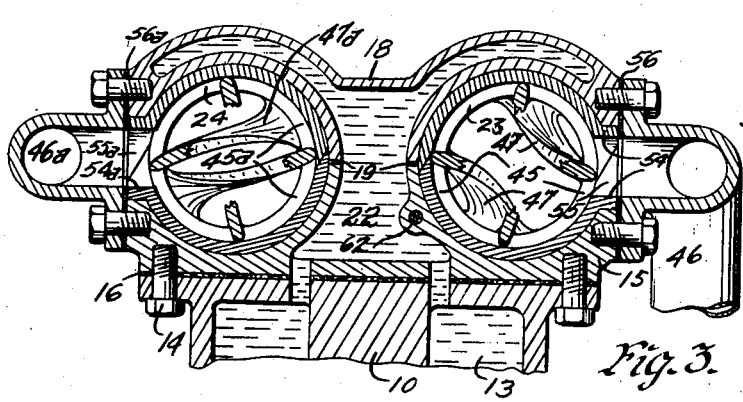
Figure 3 is a sectional view on line 3—3 of Figure 1.
Figure 6:
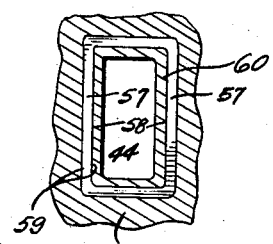
Figure 6 is a sectional view on line 6—6 of Figure 2.
Figure 4:
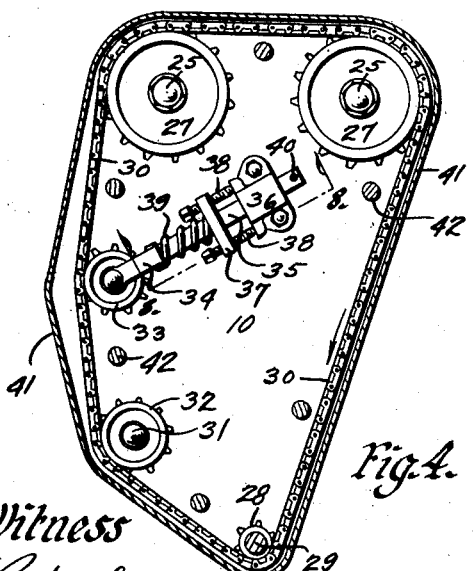
Figure 4 is a sectional view on line 4—4 of Figure 1, showing the mechanism for operating the valve tubes.

In Figure 1, I have illustrated a four cylinder engine, showing only the parts over the first three cylinders. All remaining parts are similar except as to timing.

Rotatably mounted between the cylinder head 15, and the valve head 18, is the intake valve tube 23 and the exhaust valve tube 24, which have stub shafts 25 at their forward ends. The stub shafts 25 are journalled in an opening 26 formed between the cylinder head 15 and the valve head 18.

Sprockets 27 are mounted on the forward ends of the stub shafts 25. The rear ends of the valve tubes may be similarly mounted with the exception of the sprockets 27.

For rotating the valve tubes 23 and 24, I provide a sprocket 28 on the crank shaft 29 of the engine. Motion from the crank shaft 29 is transmitted to the sprockets 27 by a chain 30 preferably of the "silent" type.

The generator, water pump, etc. usually used in connection with an internal combustion engine may be operatively connected to a shaft 31. A sprocket 32 is mounted on the shaft 31 and in a position adjacent the chain 30 so that motion of the chain 30 may be transmitted to the sprocket 32 for rotating the shaft 31, and driving the generator, water pump, etc.

Trouble is experienced with a chain drive, especially when the chain is exceptionally long as it would be when used to transmit motion from a crank shaft of an engine to its cylinder head. This trouble is due to the fact that when the chain becomes worn at the pivotal connections between the successive links it is thereby lengthened and when in motion has a tendency to oscillate.

This causes an irregular motion of the sprockets 27 and a consequent unevenness of operation of the engine due to improper and varying opening and closing of the intake and exhaust valve ports. This may be overcome by providing a suitable idler for the chain 30. I will now describe such an idler as I have found practical use for this purpose.

An idler sprocket 33 is rotatably mounted in a yoke 34. A squared extension 35 of the yoke 34 is slidably mounted in a squared opening in a bracket 36. The bracket 36 is rigidly secured to the engine block 10 by cap screws or other suitable means.

Slidably mounted on the extension 35, is a bar 37 having set screws 38 coacting with screw threads therein, the ends of which bear against the bracket 36.

A spring 39 is mounted on the extension 35 between the yoke 34 and the bar 37.

A pin 40 prevents the spring 39 from expelling the extension 35 when the chain 30 is removed for repairs, etc.

From the foregoing, it will be seen that I have provided an idler sprocket which is held against the chain 30 by the spring 39. The tension of the spring may be regulated by adjusting the set screws 38 relative to the bar 37.

The sprocket 33 will at all times bear against the chain 30, thereby compensating for wear and eliminating undesirable oscillation of the chain.

The mechanism just described for driving the valve tubes is enclosed by a suitable cover 41, which may be secured to the engine block 10 by cap screws 42.

The intake valve tube 23 has a plurality of ports 43, which register with openings 44 in the cylinder head 15 at certain predetermined periods relative to the piston 12. By putting the two ports 43 in the tube 23, diametrically opposite, I am able to cut the speed of my valve tubes down to fourth the crank shaft speed in a four cycle engine. This is a distinctive advantage over the usual type of rotary or poppet valve as it doubles the life of them.

For supplying fuel to each pair of cylinders, I provide ports 45 substantially half way between the ports for one cylinder of the pair, and those for the other.

The fuel is generated by the usual carburetor or any gas supply may be attached to the intake manifold 46. The intake manifold 46 distributes the fuel to the ports 45, any number of which may be used, depending on the number of cylinders in the engine.

As an aid to diverting the incoming fuel to the ports 43 and openings 44 at the time of their registration, I have provided fins 47 within the tube 23. These fins 47 start at the ports 45 and are properly twisted and terminate adjacent the proper port 43, thereby diverting the incoming fuel so that it will pass therethrough. Also they form a connection between A and B of the tube 23 (see Figure 1) and add the necessary strength at this point, which has been weakened by forming the ports 45.

The fins 47 are twisted to divert the incoming gas either forward longitudinally of the valve tube 23 or rearwardly as required.

The construction of a four cycle engine requires that the gas be diverted toward the one cylinder and then toward the other of the pair. This cycle is repeated as the engine keeps running, and I have shown the fins 47 twisted toward the top, then toward the bottom of the sheet, etc., as in Figure 1.

For preventing the leakage of fuel between the stationary parts of the engine and valve heads and the rotating valve tube 23, and for effectively retaining the pressure within the cylinder 11 after combustion, I have provided the following described mechanism.

Figure 5:
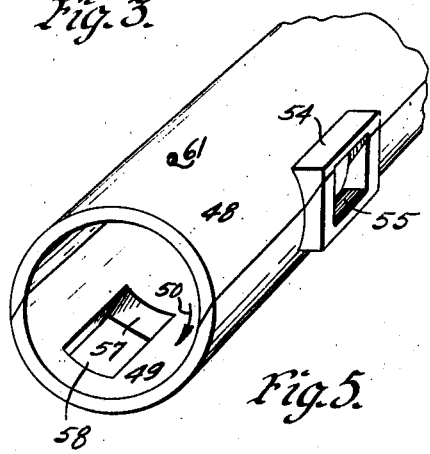
Figure 5 is a perspective view of one end of the intake sleeve showing the packing projections thereon.

A split sleeve composed of an upper half 48 and a lower half 49 has an internal diameter substantially equal to the external diameter of the tube 23. The adjoining edges between these halves are cut at an angle as shown (Figure 5) according to the direction of rotation of the valve tube as indicated by the arrow 50. This has a tendency to pull any oil in the cut toward the valve tube, thereby aiding its lubrication.

The two halves 48 and 49 are forced together by a plurality of leaf springs 51 (Figure 7), which bear at their center against the half sleeve 49.

A groove 52 in the cylinder head 15 and a groove 53 in the half sleeve 49 provides enough room for necessary play of the spring 51 during the operation of the engine.

From the foregoing, it will be seen that I have provided a packing sleeve which seals all space between itself and the rotating valve sleeve, by virtue of the pressure exerted by the spring 51. This effectively prevents leakage between the ports on the sleeve and also between these ports and the openings with which they register, except when they do register.

A projection 54 on the half sleeves 48 and 49 is split similar to them and has an opening 55 registering with the opening in the intake manifold 46.

A seal between the projection 54 and the intake manifold 46 is effected by a gasket 56.

For sealing around the opening 44, I have provided a projection 57 on the half sleeve 49, similar to the projection 54, and having an opening 58. The projection 57 fits snugly into a recess 59 in the cylinder head 15.

A portion 60 immediately surrounding the opening 44, extends into the opening 58 and terminates adjacent the rotating valve tube 23. This construction provides a plurality of sealing faces between the various parts of cylinder head 15, valve tube 23 and half sleeve 49, thereby effectively preventing the leakage of fuel between the valve tube 23 and cylinder 11 and between the ports 43 on the valve tube 23.

Pins 61 prevent any possible creeping of the upper half sleeve 48, which is prevented in the lower half sleeve 49 by the projection 57.

The exhaust valve tube 24 is similar in construction to the intake valve tube 23 with the exception of the fins 47ª, and I have therefore referred to like parts by the same reference numeral followed by the character A.

The fins 47ª are similar to the fins 47, except that they are oppositely twisted and designed to divert outcoming exhaust gas from the opening 44ª and the port 43ª toward the exhaust ports 45ª.

The fins 47ª aid the engine in clearing the cylinders of dead gas by their centrifrugal action. Being in the form of fins or blades, they also have a cooling effect to the exhaust valve tube 24 and manifold 46ª, which causes contraction of the exhaust gas, thereby decreasing its volume and back pressure on the piston 12.

For properly lubricating the valve tubes, I provide an oil passage 62 running longitudinally through the engine block 10, and connected to a suitable oil pump as commonly used for the lubrication of the working parts of an internal combustion engine.

Transverse oil passages 63 are provided at convenient points such as between the ports 43 and 45, and convey the oil to short tubes 64; which terminate adjacent the rotating valve tubes 23 and 24, thereby depositing the oil on their surfaces. The tubes 64 pass through openings 65 in the half sleeves 49 and 49ª.

The openings 65, being slightly larger than the tubes 64, permit necessary movements of the sleeves, when the engine is running.

Oil grooves 66 distribute the oil evenly on the surfaces of the valve tubes (Figure 1).

For disposing of excess oil, an oil passage 67, through a tube 68, collects the excess oil from the surfaces of the valve tube and conducts it down to the crank case of the engine.

It will be seen that I have provided a fuel and exhaust gas control device that can be used in connection with internal combustion engines or can also be used, by different timing and valve port arrangements, for controlling the admission and exhaust of steam or compressed air to engines designed for their use.

I have provided efficient and effective packing means throughout its construction and suitable means for driving the valve tubes.

By the proper use of fins within the valve tubes, I have substantially aided the ingress of fuel and egress of exhaust gas. My device is inexpensive and the working parts can be easily inspected or replaced, by simply removing the spark plugs, valve head and the cover 41.

My device comprises comparatively few working parts and has the added advantage of a positive port closure which cannot be obtained at the higher speeds with engines having spring closed valves.

Some changes may be made in the construction and arrangement of the various parts of my invention, without departing from the real spirit and purpose of my invention, and it is my intention to cover by my claims, any modified forms of structure or use of mechanical equivalents, which may be reasonably included within their scope.

I claim as my invention:

1. In combination with an engine requiring periodical admission of fuel or compressed gas and the periodical expulsion of exhausted gas, intake and exhaust tubes rotatably mounted in the head of said engine, inlet ports in said intake tubes for receiving the fuel, outlet ports in said intake tube longitudinally spaced on either side of said inlet ports and arranged to register with inlet openings in the cylinders of said engine, fins arranged within said intake tube for respectively diverting the incoming gas to said spaced outlet ports, outlet openings in the cylinders of said engine arranged to register with longitudinally spaced inlet ports in said exhaust tube, outlet ports in said exhaust tube between said inlet ports, fins arranged within said exhaust tube for diverting the exhaust gases respectively from said cylinders to said outlet ports, longitudinally split sleeves surrounding said valve tubes, a plurality of springs adjacent the lower halves of said split sleeves, perforated projections on said sleeves, recesses in said cylinder head designed to receive said projections, portions of said cylinder head extending inside of said projections and terminating adjacent said valve tubes, and means connected with the crank shaft of said engine for rotating said valve tubes.

2. In combination with an engine requiring periodical admission of fuel or compressed gas and the periodical expulsion of exhausted gases, intake and exhaust tubes rotatably mounted in the head of said engine, inlet ports in said intake tubes for receiving the fuel, outlet ports in said intake tube longitudinally spaced on either side of said inlet ports and arranged to register with inlet openings in the cylinders of said engine, fins arranged within said intake tube for respectively diverting the incoming gas to said spaced outlet ports, outlet opening in the cylinders of said engine, arranged to register with longitudinally spaced inlet ports in said exhaust tube outlet ports in said exhaust tube between said inlet ports, fins arranged within said exhaust tube for diverting the exhaust gases respectively from said cylinders to said outlet ports, longitudinally split sleeves surrounding said valve tubes, a plurality of springs adjacent the lower halves of said split sleeves, perforated projections on said sleeves, recesses partly in the cylinder head and partly on the valve head designed to receive said porjections, gaskets fitting against the ends of said projections, perforated projections on said sleeves, recesses in said cylinder head designed to receive said projections, portions of said cylinder head extending inside of said projections and terminating adjacent said valve tubes, and means connected with the crank shaft of said engine for rotating said valve tubes.

3. A valve of the class described comprising a tubular opening in the head of an engine, a longitudinally split sleeve lining said tubular opening, a tubular like projection on said sleeve designed to coact with a recess in the head of the engine, said head having a tubular like portion projecting within said projection on said sleeve and a tubular ported valve rotatably mounted in said split sleeve.

4. A valve of the class described comprising tubular openings in the head of an engine, split sleeves lining said tubular openings, tubular like projections on said sleeves designed to coact with recesses in the head of the engine, said head having tubular like portions projecting within said projections on said sleeves, tubular valves rotatably mounted in said split sleeve, ports in said valve, for registering with the openings formed by the tubular projections on said sleeves, and means for emitting gas to or expelling gas from said tubular valves between each pair of openings in said tubular valve.

5. A valve of the class described comprising a tubular opening in the head of an engine lined with a longitudinally split sleeve, tubular extensions on said sleeve for coacting with recesses in the head of said engine, parts of said head extending within said tubular extensions and openings within said parts for communicating with each cylinder of said engine, ports therein for registering with openings from each cylinder of the engine, means between each pair of said ports for emitting or expelling gas, and fins within said tube arranged to deflect and force the flow of the gas from said means alternately to the ports on each side of said means, or vice versa depending on whether the tube is for intake or exhaust.

JOYCE WICKERSHAM.